United States Patent
Guralnik et al.

(10) Patent No.: US 7,096,153 B2
(45) Date of Patent: Aug. 22, 2006

(54) PRINCIPAL COMPONENT ANALYSIS BASED FAULT CLASSIFICATION

(75) Inventors: Valerie Guralnik, Orono, MN (US); Wendy K Foslien, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 32 days.

(21) Appl. No.: 10/826,614

(22) Filed: Apr. 16, 2004

(65) Prior Publication Data

US 2005/0141782 A1 Jun. 30, 2005

Related U.S. Application Data

(63) Continuation-in-part of application No. 10/750,222, filed on Dec. 31, 2003.

(51) Int. Cl.
*G06F 17/18* (2006.01)
(52) U.S. Cl. .................. 702/179; 702/187; 702/188
(58) Field of Classification Search .............. 702/33, 702/34, 116, 179, 180, 182, 185, 186, 188, 702/189; 700/28–30, 47, 49, 108
See application file for complete search history.

(56) References Cited

U.S. PATENT DOCUMENTS

| | | | |
|---|---|---|---|
| 5,442,562 A | | 8/1995 | Hopkins et al. |
| 5,680,409 A | * | 10/1997 | Qin et al. .................. 714/799 |
| 5,864,773 A | | 1/1999 | Barna et al. |
| 6,442,445 B1 | | 8/2002 | Bunkofske et al. |
| 6,594,620 B1 | | 7/2003 | Qin et al. |
| 6,853,920 B1 | * | 2/2005 | Hsiung et al. ................. 702/1 |
| 6,865,509 B1 | * | 3/2005 | Hsiung et al. ............. 702/182 |
| 2004/0176901 A1 | | 9/2004 | Uluyol et al. |
| 2005/0149297 A1 | | 7/2005 | Guralnik et al. |

* cited by examiner

*Primary Examiner*—Bryan Bui
(74) *Attorney, Agent, or Firm*—Kris T Fredrick

(57) ABSTRACT

Principal Component Analysis (PCA) is used to model a process, and clustering techniques are used to group excursions representative of events based on sensor residuals of the PCA model. The PCA model is trained on normal data, and then run on historical data that includes both normal data, and data that contains events. Bad actor data for the events is identified by excursions in Q (residual error) and T2 (unusual variance) statistics from the normal model, resulting in a temporal sequence of bad actor vectors. Clusters of bad actor patterns that resemble one another are formed and then associated with events.

15 Claims, 4 Drawing Sheets

PRINCIPAL COMPONENT ANALYSIS BASED FAULT CLASSIFICATION

This application is a continuation-in-part of U.S. application Ser. No. 10/750,222 filed on Dec. 31, 2003 which is incorporated herein by reference.

FIELD OF THE INVENTION

The present invention relates to fault classification, and in particular to principal component analysis based fault classification for a process.

BACKGROUND OF THE INVENTION

A complicated process may be monitored by hundreds of sensors. When there is a problem or event with the process, residuals of the problem may be reflected by measurements of many different sensors. While the event may be manifested in one part of the process, sensors monitoring that part of the process will provide values that reflect the event. Sensors monitoring other parts of the process may also sense values that are outside of normal range. With sensors in different parts of the process all reflecting out of range values, it becomes difficult to recognize the actual part of the process that is directly involved in the event. There is a need for a mechanism to help operators of the process understand events that occur.

SUMMARY OF THE INVENTION

Principal Component Analysis (PCA) is used to model a process, and clustering techniques are used to group excursions representative of events based on sensor residuals of the PCA model. The PCA model is trained on normal data, and then run on historical data that includes both normal data, and data that contains events. Bad actor data for the events is identified by excursions in Q (residual error) and T2 (unusual variance) statistics from the normal model, resulting in a temporal sequence of bad actor vectors. Clusters of bad actor patterns that resemble one another are formed and then associated with events.

A time stamp is an indication of a point or window in time during which data is obtained from the sensors. For each time stamp, the PCA model gives a vector of residual errors. If the Q statistic, which is the length of that vector (in Euclidean space) is above a certain threshold, that vector of residuals becomes a bad actor. In one embodiment, a residual vector with Q above a threshold is considered to be a bad actor. In another embodiment, a sufficient number of more or less consecutive observations of the Q statistic above the threshold for a residual vector is to be considered a bad actor.

In one embodiment, change-point detection methods may be used to identify predominant clusters and groups of time stamps that belong to such clusters. As some faults progress, the sensors contributing to Q-residual change, and thus the clusters describing the event will change. In a further embodiment, qualitative trend analysis techniques may be used to associate the sequence of clusters identified as a function of time to uniquely identify the signatures of each fault.

During online operation of the process, the PCA model is run on incoming data. General statistics Q and T2 for the model indicate events. If an event is indicated, the nearest cluster for each time slice of bad actors is found and a sequence of cluster labels is generated. The nearest cluster identifies the likely event. A sequence of cluster matches may also be used to identify events or sequences of events.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Figure 1:
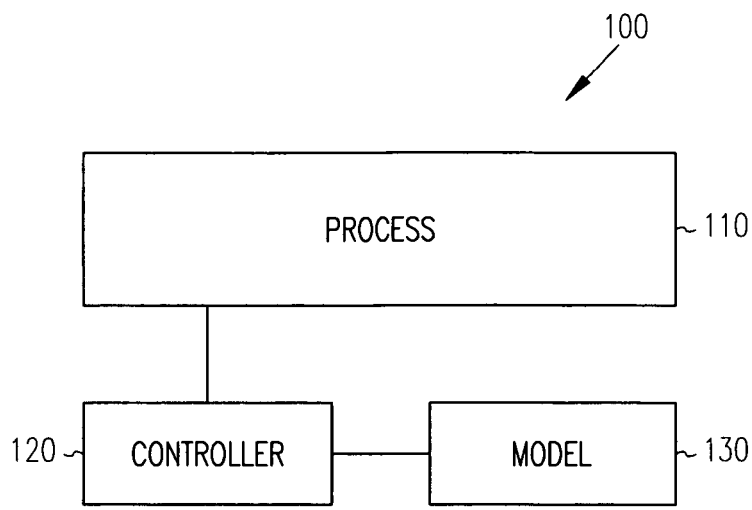
FIG. 1 is a block diagram showing one embodiment of a process control system according to an embodiment of the invention.

An example process being controlled or monitored is shown generally at 100 in FIG. 1. Process 110 is controlled by a controller 120 that is coupled to the process by hundreds, if not thousands of sensors, actuators, motor controller, etc. The sensors provide data representative of the state of the process at desired points in time. For example, a vessel may have multiple temperature sensors, level sensors, pressure sensors and flow sensors monitoring the state of the vessel. The vessel may be connected by multiple pipes to other vessels that are similarly equipped, as are the pipes connecting them. Many of the sensors are provided with normal ranges that correspond to normal operation of the process. In other words, the temperature of fluid in a vessel may be specified to be within a certain temperature range for normal operation. When it deviates from that range, an event may be occurring. Multiple sensors may detect the out of range or out of spec temperature in the vessel, the level of the vessel may also go out of range, and down stream temperature sensors may also sense out of range values during the event. There may also be multiple events occurring in the process simultaneously, or in sequence. The sensor readings may not be easily interpreted by an operator to correctly determine what event or events are occurring.

The same part of the process may be measured by multiple sensors. There are different ways in which the process can go wrong. The combination of sensors indicating that something goes wrong (like being out of range, or other indicators) is a clue of what is exactly wrong with the process.

In one embodiment, a principal component analysis (PCA) model 130 is coupled to the controller 120, and receives the values of the sensors at predetermined times. The time is at one-minute intervals for some processes, but may be varied, such as for processes that may change more quickly or slowly with time. PCA is a well known mathematical model that is designed to reduce the large dimensionality of a data space of observed variables to a smaller intrinsic dimensionality of feature space (latent variables), which are needed to describe the data economically. This is the case when there is a strong correlation between observed variables.

PCA model 130 has been modified in one embodiment of the present invention to provide clustering techniques that are used to group excursions representative of events based on sensor residuals of the PCA model. In one embodiment, each excursion is represented as a vector in N-dimensional space, where N is the number of sensors and the values of the sensor residuals are the weights of the vector. The vectors are then clustered using a traditional K-means clustering algorithm to cluster relevant errors The PCA model is trained on normal data, and then run on historical data that includes both normal data, and data that contains abnormal events, the type of which was determined by experts. The types of events were labeled based on the particular process, in this case, Event A, Event B, and Event C. Different labels may be used as desired, such as straight forward alphabetic labels, A, B, C, etc.

The historical data in one embodiment included 19260 data points. Exclusions were clustered by generating a residual bad actor vector for every data point, where the Q statistic exceeded a threshold. The data set of bad actor vectors was reduced to 3231 points, corresponding to known events. Bad actor data for the events is identified by excursions in Q (residual error) and T2 (unusual variance) statistics from the normal model, resulting in a temporal sequence of bad actor vectors. Clusters of bad actor patterns that resemble one another are formed and then associated with events.

In one embodiment, only the top contributors are included in the clusters. A feature-scoring scheme based on rank, value and percent of the contribution to the Q-residual for each individual sensor is used to identify the relative importance a feature based on absolute relative values. For example, only top-contributors that contribute to 90% (or 80%) of the error are used. This likely includes only four to five contributors. In a further embodiment, top-contributors that have absolute values that are drastically different (for example 10 times more) then absolute values of other contributors are used. The threshold values may be determined through change point detection methods to identify significant changes in sequences of contributor values. In yet a further embodiment for variable reduction, the thresholds may be predetermined values. The minimum/maximum number of top-contributors may also be predetermined. Top-contributors may be refined by using one scheme first, and then applying the second scheme (to add/delete) top contributors.

For example, one cluster may be related to a heat pump failure. The top four contributors to Q or T2 are variables 1, 2, 5 and 7. They comprise a common group of bad actors that are labeled as cluster A. A further failure may be contributed to by variables 7, 8, 2 and 1. These may be labeled as cluster B. In one embodiment, up to the top ten contributors are included in a cluster. In essence, the data is taken from the model and known patterns are mapped to events.

During operation, events are identified by determining the cluster that best matches contribution vectors of the points of high Q-residual and constructing cluster sequences to be compared against a library of fault signatures.

In one embodiment determining a cluster can be done by computing a distance from a centroid of the cluster (a point in the vector space that represents the cluster) to the bad actor(s) representing the event. In another embodiment, the distance is computed from the bad actor to the medoid of the cluster (one of the data points from the cluster that best represents a cluster). The definition of the distance may vary from one embodiment to another (Euclidean, Manhattan, etc.), but in general the method of determining the best cluster will depend on the method by which the clusters are constructed. For example, if the clusters are constructed around centroids by using the Euclidean distance, then this definition should also be used in determining best fit clusters. The signatures and cluster are useful for determining known process fault conditions. In real operations, process faults will also occur that have never been anticipated or encountered before.

New data may be used to iteratively refine the clustering solution by adding new clusters, splitting existing clusters, or moving points between clusters. Changes in clustering solutions are restricted based on cost-benefit tradeoff, the points' proximity in time, as well as historical performance of the clusters and fault signatures to predict and classify events.

Figure 2:
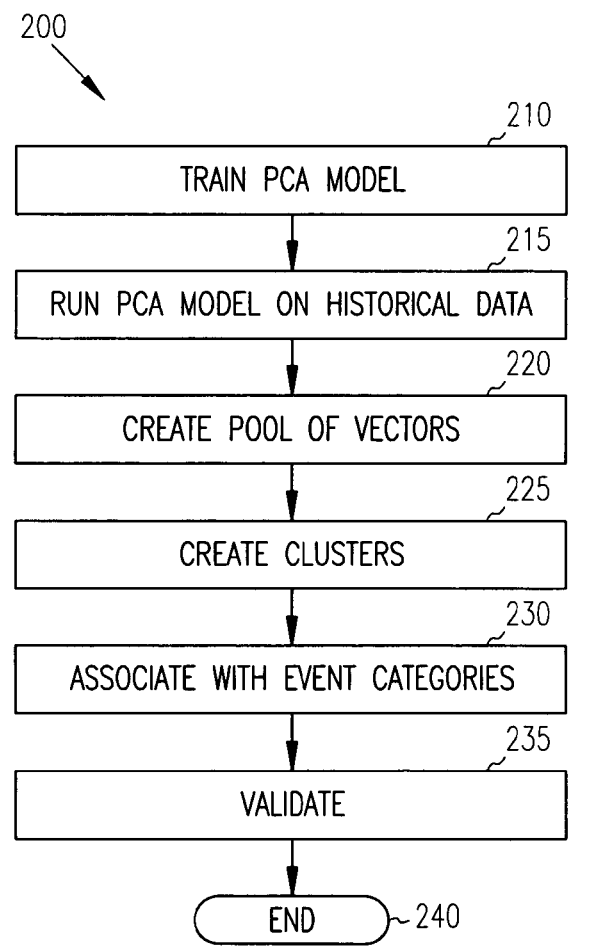
FIG. 2 is a flow chart describing training of a PCA model in one example embodiment of the invention.

A flowchart in FIG. 2 illustrates one embodiment of training the PCA model 130 generally at 200. Historical process date falls into two categories, normal and abnormal event. The event data may fall into several event categories. One embodiment of the invention creates a model that accurately distinguishes normal data from event data, and further, identifies the correct event category.

At 210, the PCA model is trained on normal data. The PCA model is then run on general historical data at 215. The general historical data includes both normal and event data. Bad actor data for the events is identified by excursions in the Q and T2 statistics for the normal model. At each time sample, a pool of vectors of bad actor data, with temporal ordering is created at 220. This is done for events that are identifiable by the PCA model.

Using the bad actor vectors at 225, clusters are created. Spacial clustering is used to determine which bad actor patterns resemble one another. Temporal sequences of clusters are then associated with event categories at 230, and annotated event data is used to validate the resulting model at 235. The training process ends, and the model may be run against a real time operating process.

Figure 3:
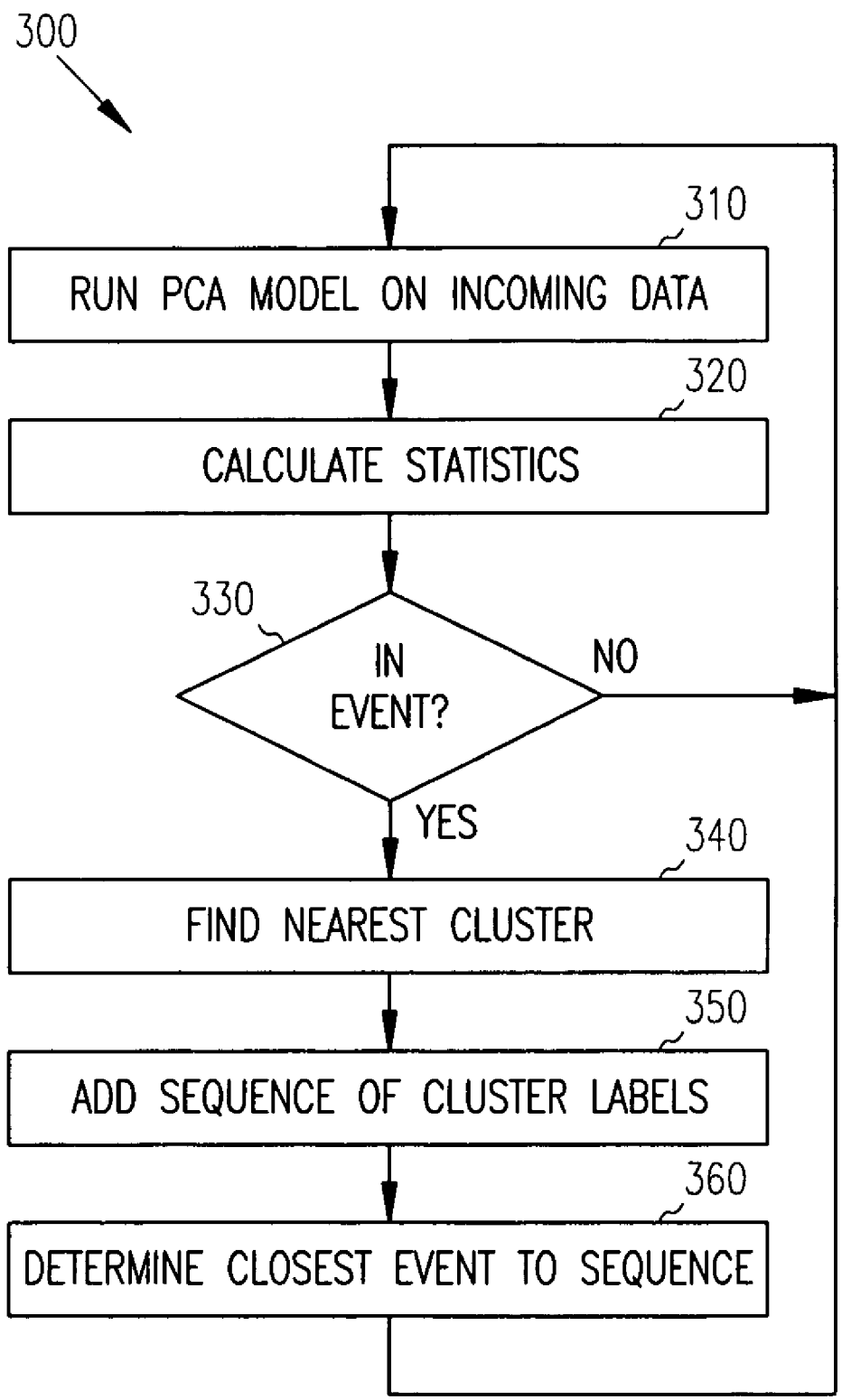
FIG. 3 is a flow chart describing running of the PCA model during online operation of a process being modeled in one example embodiment of the invention.

A method of running the model against the operating process is shown at 300 in FIG. 3. The PCA model 130 receives real time data from the controller 120 as the process 110 is operating. Sets of data are provided at predetermined time slices, such as every minute. The amount of time between time slices may be varied as desired. The PCA model is then run on the incoming data at 310, and Q and T2 statistics for the time slices are calculated at 320. If all the variables in time slices are within specification, or no other indicators of an event are detected at 330, the model continues to run on further time slices at 310.

If an event is detected at 330, the cluster or clusters are then found that are nearest to known clusters, and a sequence of cluster labels is added to at 350. The sequence of cluster matches is then used to determine which event is closest at 360. The model then continues to run. In one embodiment, the model will continue to run and receive operational data during processing of received data, such as by running multiple simultaneous threads.

Figure 4:
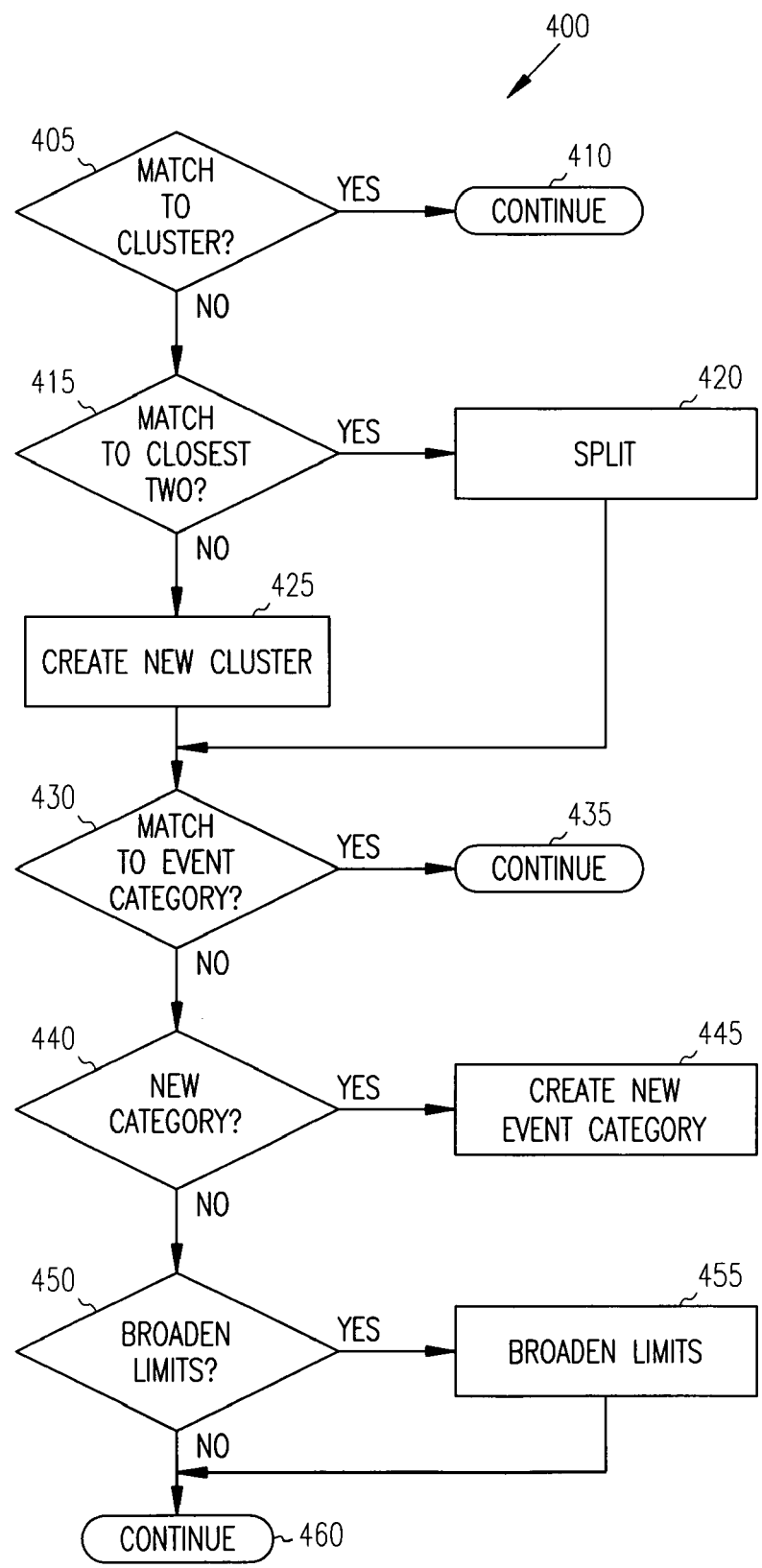
FIG. 4 is a flow chart describing adaptation of the PCA model in one example embodiment of the invention.

In some cases, a match to a cluster may not be found. Several actions may be taken as illustrated generally at 400 in FIG. 4. At 405, if a match to a cluster is found, it is treated normally as above, and processing continues at 410. If no cluster match is found, a check is made at 415 to determine if two clusters might provide a good match, such as the two closest clusters. A goodness of fit algorithm is applied to determine which might be the closest pair of clusters. If a pair is found, the cluster is split at 420. If the closest two are not a good match at 415, a new cluster is created at 425 using a fitness metric that considers all the bad actors. In an alternative embodiment, when a good match is not found, the following steps can be taken. Find the best match. Check if by adding a new point and splitting this cluster in to two, a good solution is obtained. If yes, do exactly that. If not create a new cluster. As an option, check if any other points from other clusters have a better fit to this new cluster. If so, the clusters are rearranged accordingly.

Following assignment of clusters, the sequence of clusters is compared to known event categories at 430. If the event categories match, processing continues normally at 435. If the event categories do not match at 430, a new event, not known in the training data may be the cause as determined at 440. A new event category is created at 445, and processing continues normally at 447. If a new category is not required, the event definition may need to be generalized. A check is made to determine if the limits may need to be broadened for the sequence at 450. If so, they are broadened at 455, and online operations continue at 460.

Figure 5:
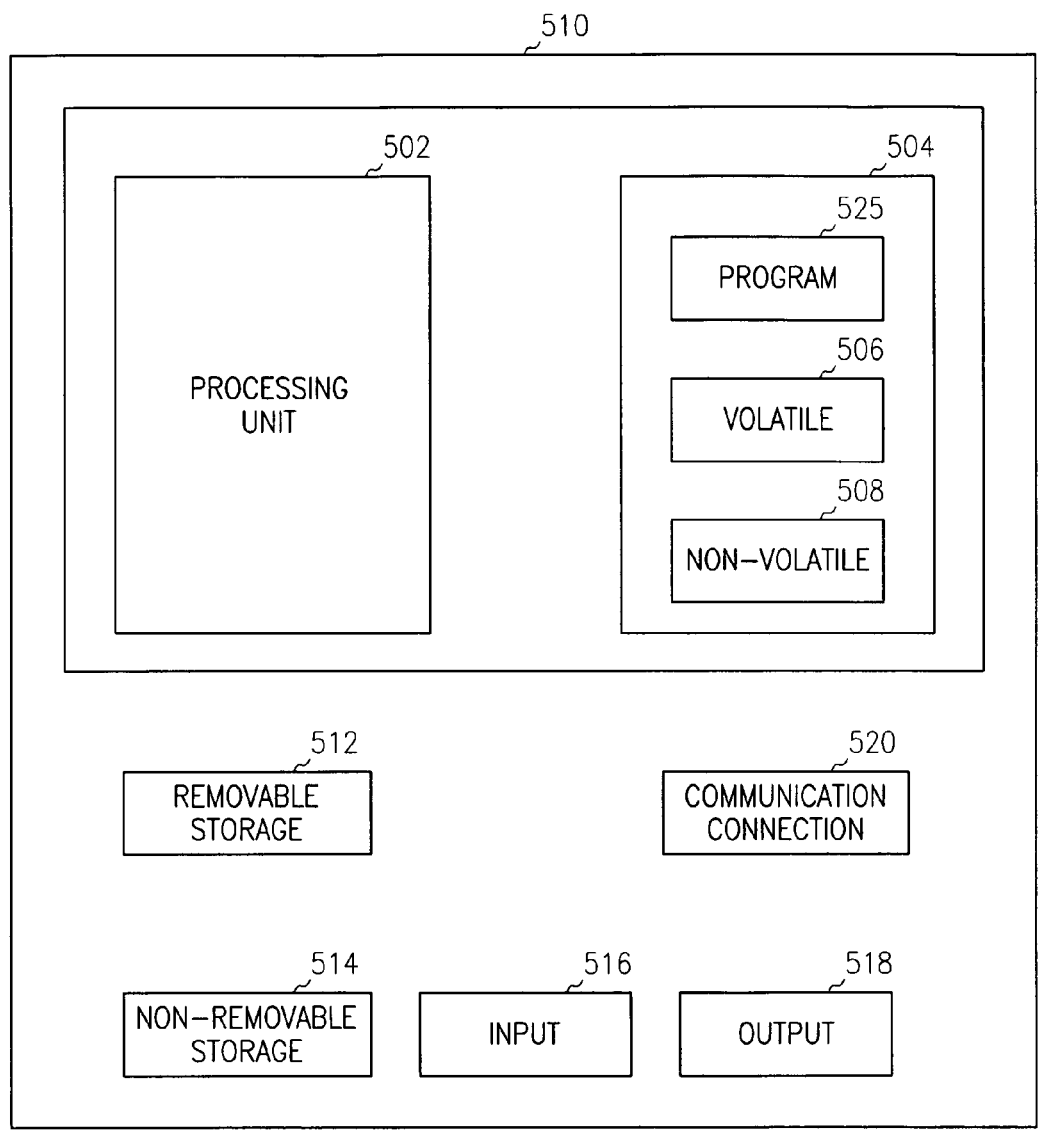
FIG. 5 is a flow chart of a system for running the PCA model in one example embodiment of the invention.

A block diagram of a computer system that executes programming for performing the above algorithm is shown in FIG. 5. The system may be part of controller 120. Model 130 may also comprise a similar system, or may be included in controller 120. A general computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), eraseable programmable read-only memory (EPROM) & electrically eraseable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a computer-readable medium. For example, a computer program 525 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer system 500 to provide generic access controls in a COM based computer network system having multiple users and servers.

The invention claimed is:

1. A system for identifying events in a process, the system comprising:
   a controller coupled to sensors monitoring a process;
   a principal component analysis model receiving data from the sensors monitoring the process and reducing a number of variables associated with the data from the sensors, the model further comprising:
   a training module that is run on historical data to create a pool of vectors with values for the variables, wherein the training module further creates clusters of bad actors from the values based on statistics and associates the clusters with known events; and
   a run time module that receives incoming data from the sensors, calculates statistics, determines if events are occurring, and identifies clusters to identify events.

2. The system of claim 1 wherein the run time module calculates statistics related to the principal component analysis model, determines and finds a nearest cluster of bad actors related to the event to identify the event.

3. The system of claim 1 wherein the run time module identifies a sequence of cluster matches and correlates the sequence of cluster matches to known events.

4. The system of claim 1 wherein the model further determines if a cluster needs to be split when new bad actors are added and splits the cluster into two clusters using a goodness of fit criteria.

5. The system of claim 4 wherein the model determines if a new event category is encountered and broadens limits for the sequence of clusters.

6. The system of claim 1 wherein a cluster is limited to a predetermined number of bad actors.

7. The system of claim 1 wherein the statistics comprise Q and T2.

8. The system of claim 1 wherein the model uses a feature scoring scheme to identify top contributors of bad actors.

9. The system of claim 8 wherein the feature scoring scheme is based on rank, value, and percent of contribution to a Q-residual sensor to identify a relative importance.

10. The system of claim 9 wherein the top-contributors are determined based on a majority percentage of the Q-residual.

11. The system of claim 9, where the top-contributors are determined based on only the contributors with absolute values that are drastically different from values of other contributors.

12. The system of claim 9 wherein the scoring scheme is based on predetermined limits.

13. The system of claim 12 wherein, the limits are computed statistically through change point detection methods.

14. The system of claim 8, wherein a predetermined minimum/maximum number of contributors are selected from rank, value, and percent of contribution to a Q-residual sensor to identify a relative importance.

15. A system for identifying events in a process, the system comprising:

means for monitoring a process via sensors;

means for receiving data from the sensors monitoring the process and reducing a number of variables associated with the data from the sensors to produce a principal component analysis model, the model further comprising:

means run on historical data for creating a pool of vectors with values for the variables, and creating clusters of bad actors from the values based on statistics and associates the clusters with known events; and means for receiving incoming data from the sensors, calculating statistics, determining if events are occurring, and identifying clusters to identify events.

* * * * *